United States Patent
Lin et al.

(10) Patent No.: US 7,317,842 B2
(45) Date of Patent: Jan. 8, 2008

(54) GLOBAL AND LOCAL STATISTICS CONTROLLED NOISE REDUCTION SYSTEM

(75) Inventors: Peng Lin, Irvine, CA (US); Yeong-Taeg Kim, Irvine, CA (US)

(73) Assignee: Samsung Electronics Co., Ltd., Suwon (KR)

(*) Notice: Subject to any disclaimer, the term of this patent is extended or adjusted under 35 U.S.C. 154(b) by 687 days.

(21) Appl. No.: 10/697,362

(22) Filed: Oct. 30, 2003

(65) Prior Publication Data

US 2005/0094889 A1   May 5, 2005

(51) Int. Cl.
 *G06K 9/40* (2006.01)
(52) U.S. Cl. ...................... 382/261; 382/275
(58) Field of Classification Search ............. 382/261, 382/275
See application file for complete search history.

(56) References Cited

U.S. PATENT DOCUMENTS

| 5,526,446 A * | 6/1996 | Adelson et al. ............ 382/275 |
| 5,581,370 A * | 12/1996 | Fuss et al. ................ 358/447 |
| 5,764,307 A * | 6/1998 | Ozcelik et al. ............ 348/608 |
| 5,771,318 A * | 6/1998 | Fang et al. ................ 382/261 |
| 5,844,627 A * | 12/1998 | May et al. ................. 348/607 |
| 6,757,442 B1 * | 6/2004 | Avinash ..................... 382/274 |
| 2002/0181024 A1 * | 12/2002 | Morimoto et al. ......... 358/3.15 |

FOREIGN PATENT DOCUMENTS

WO   WO 02102086 A2 *  12/2002

OTHER PUBLICATIONS

S.I. Olsen, *Noise Variance Estimation in Images: An Evaluation*, Graphical Models and Image Processing, University of Copenhagen, Department of Computer Science, vol. 55, No. 4, pp. 319-323, 1993.

* cited by examiner

*Primary Examiner*—Jingge Wu
*Assistant Examiner*—Bernard Krasnic
(74) *Attorney, Agent, or Firm*—Kenneth L. Sherman; Michael Zarrabian; Myers Dawes Andras & Sherman, LLP (57) ABSTRACT

A global and local statistics controlled noise reduction system in which the video image noise reduction processing is effectively adaptive to both image local structure and global noise level. A noise estimation method provides reliable global noise statistics to the noise reduction system. The noise reduction system dynamically/adaptively configures a local filter for processing each image pixel, and processes the pixel with that local filter. The filtering process of the noise reduction system is controlled by both global and local image statistics that are also computed by the system.

16 Claims, 7 Drawing Sheets

GLOBAL AND LOCAL STATISTICS CONTROLLED NOISE REDUCTION SYSTEM

FILED OF THE INVENTION

The present invention relates generally to video image processing, and more particularly to noise reduction in video images.

BACKGROUND OF THE INVENTION

Video images are often corrupted by noise during the video image acquisition or transmission process. In order to improve the visual appearance of such images, an effective filtering technique is often required to reduce the noise level therein. Traditional noise reduction techniques mainly involve applying a linear filter such as an averaging filter to all of the pixels in a video frame ("image"). While this reduces noise level in the image, such a linear filtering technique also indiscriminately blurs edges in the image.

In order to prevent image edge blurring, a noise reduction filter must be adaptive to local structures, such as edges, in the image. One such adaptive technique is known as directional filtering. Directional filtering attempts to avoid image blurring by adapting linear filtering to image edge directions in such a way that the filter utilized is always applied along the edge direction not across the edge direction.

Figure 1:
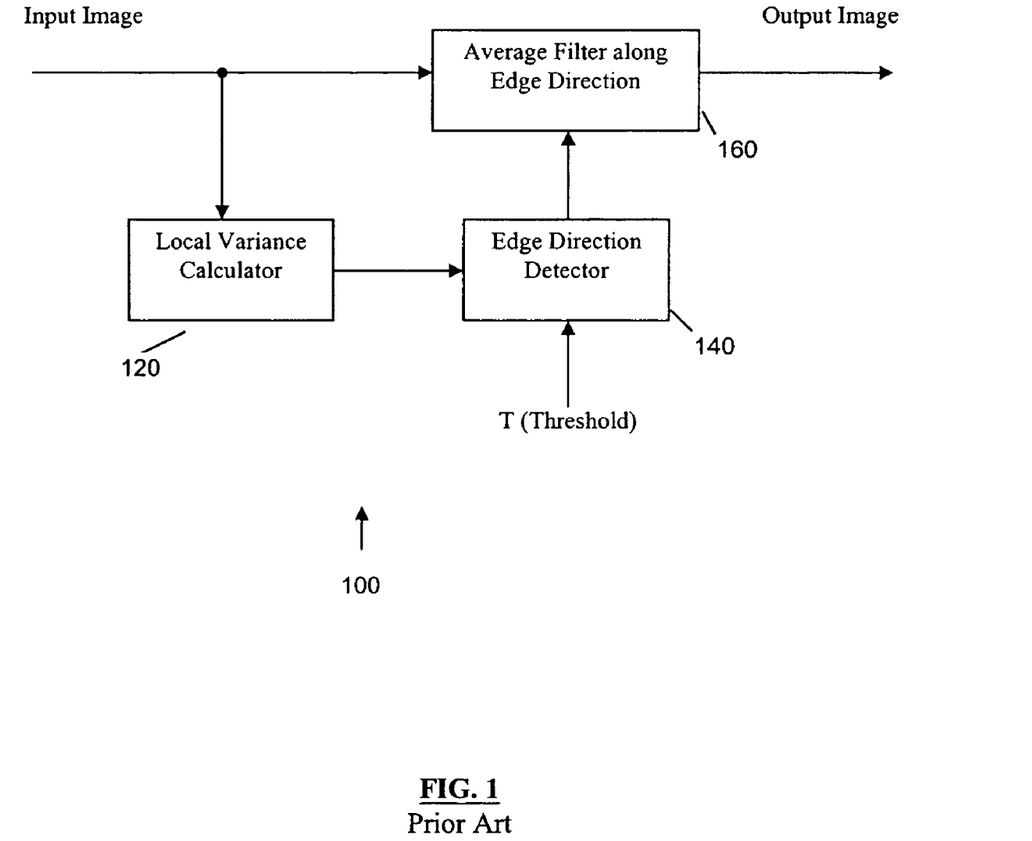
FIG. 1 shows a block diagram of a prior art directional filter.

FIG. 1 shows a block diagram of an example directional filter 100. At each image pixel, first the 2-D local variance is computed by a local variance calculator 120 for a small window. Then, the 1-D local variances are computed along the horizontal, vertical, diagonal from upper left to lower right, and diagonal from upper right to lower left directions within the same window of pixels. To determine the edge direction, the 2-D variance is compared with a predetermined threshold in an edge direction detector block 140. If the 2-D variance is less than the threshold, then no edge is present at the pixel, and the pixel is considered having "no direction". If the 2-D variance is greater than the threshold, then an edge is present at that pixel, and the direction with the smallest 1-D variance is considered as the edge direction of the pixel. Utilizing a filter 160, at "no direction" pixels, a 2-D average filter is applied. At a pixel with a detected edge direction, a 1-D average filter is applied along the detected direction. By filtering along image edge directions, the directional filter 100 is able to retain most of the image structures while reducing the noise level of the input image.

There are two major shortcomings to the directional filtering technique. The first is that the threshold value must be manually tuned and usually it is difficult to select the right value. An improperly selected threshold value will cause either image blurring or insufficient noise reduction. The second shortcoming of the directional filter is that the filter strength is fixed. That means a relatively clean image is processed the same way as a highly noisy image. This causes the relatively clean image to unnecessarily lose some fine structures and be degraded.

BRIEF SUMMARY OF THE INVENTION

The present invention addresses the above shortcomings. As such, in one embodiment the present invention provides a global and local statistics controlled noise reduction system wherein the video image noise reduction processing is effectively adaptive to both image local structure and global noise level. And, a noise estimation method according to the present invention provides reliable global noise statistics to the noise reduction system.

Such a global and local statistics controlled noise reduction system dynamically/adaptively configures a local filter for processing each image pixel, and processes the pixel with that local filter. The filtering process of the noise reduction system is controlled by both global and local image statistics that are also computed by the system. In one example, the local statistics computed by the system are 1-D and 2-D local variances, and the global statistics computed by the system is the global noise standard deviation. The local filter configured by the system for each image pixel has different filtering directions and variable strength for different pixels. The direction of the local filter is determined by 1-D local variances. The strength of the local filter is computed directly from the local variances and the global noise standard deviation.

According to a further aspect of the present invention, the global noise standard deviation is estimated by a noise estimation method. First, the image is divided into overlapping or non-overlapping blocks, and the mean and the standard deviation of each block are calculated. Then, the smallest standard deviation is found together with the corresponding block mean. After the smallest standard deviation and its corresponding mean have been found, a "saturation checking" process is applied to determine whether the block with the smallest standard deviation has saturated. This determination is based on the relation between the smallest standard deviation and its corresponding mean.

If saturation is not detected, the calculated block standard deviations that are within a neighboring interval centered at the smallest standard deviation are averaged, and the average value is taken as the estimated global noise standard deviation. The radius of the neighboring interval depends on the value of the smallest standard deviation.

If saturation is detected, first a saturation compensation term is added to the smallest standard deviation to generate a compensated smallest standard deviation. The saturation compensation term is computed from the smallest standard deviation and its corresponding mean. Then, the calculated block standard deviations that are within a neighboring interval centered at the compensated smallest standard deviation are averaged to obtain the estimated global noise standard deviation. The noise standard deviation is used in the noise reduction system.

Other objects, features and advantages of the present invention will be apparent from the following specification taken in conjunction with the following drawings.

DETAILED DESCRIPTION OF THE INVENTION

As noted above, in one embodiment the present invention provides a global and local statistics controlled noise reduction system wherein the video image noise reduction processing is effectively adaptive to both image local structure and global noise level. And, a noise estimation method according to the present invention provides reliable global noise statistics to a noise reduction system. The system dynamically configures a local filter for processing each image pixel, and processes the pixel with that local filter. The filtering process is controlled by both global and local image statistics. In one example, the local statistics computed by the system are 1-D and 2-D local variances, and the global statistics computed by the system is the global noise standard deviation. The dynamically configured local filter has different directions and variable strength for different pixels. The direction of the local filter is determined by 1-D local variances. The strength of the local filter is computed directly from the local variances and the global noise standard deviation.

The global noise standard deviation is estimated by a preferred noise estimation method that comprises the following steps. First, the image is divided into overlapping or non-overlapping blocks, and the mean and the standard deviation of each block are calculated. Then, the smallest standard deviation is found together with the corresponding block mean. After the smallest standard deviation and its corresponding mean have been found, a "saturation checking" process is applied to determine whether the block with the smallest standard deviation has saturated. The process is based on the relation between the smallest standard deviation and its corresponding mean.

If no saturation is detected, the calculated block standard deviations that are within a neighboring interval centered at the smallest standard deviation are averaged, and the average value is taken as the estimated global noise standard deviation. The radius of the neighboring interval depends on the value of the smallest standard deviation. If saturation is detected, first a saturation compensation term is added to the smallest standard deviation to generate a compensated smallest standard deviation. The saturation compensation term is computed from the smallest standard deviation and its corresponding mean. Then, the calculated block standard deviations that are within a neighboring interval centered at the compensated smallest standard deviation are averaged to obtain the estimated global noise standard deviation (the radius of the neighboring interval depends on the value of the compensated smallest standard deviation). The global noise standard deviation is used in the noise reduction system.

Figure 2:
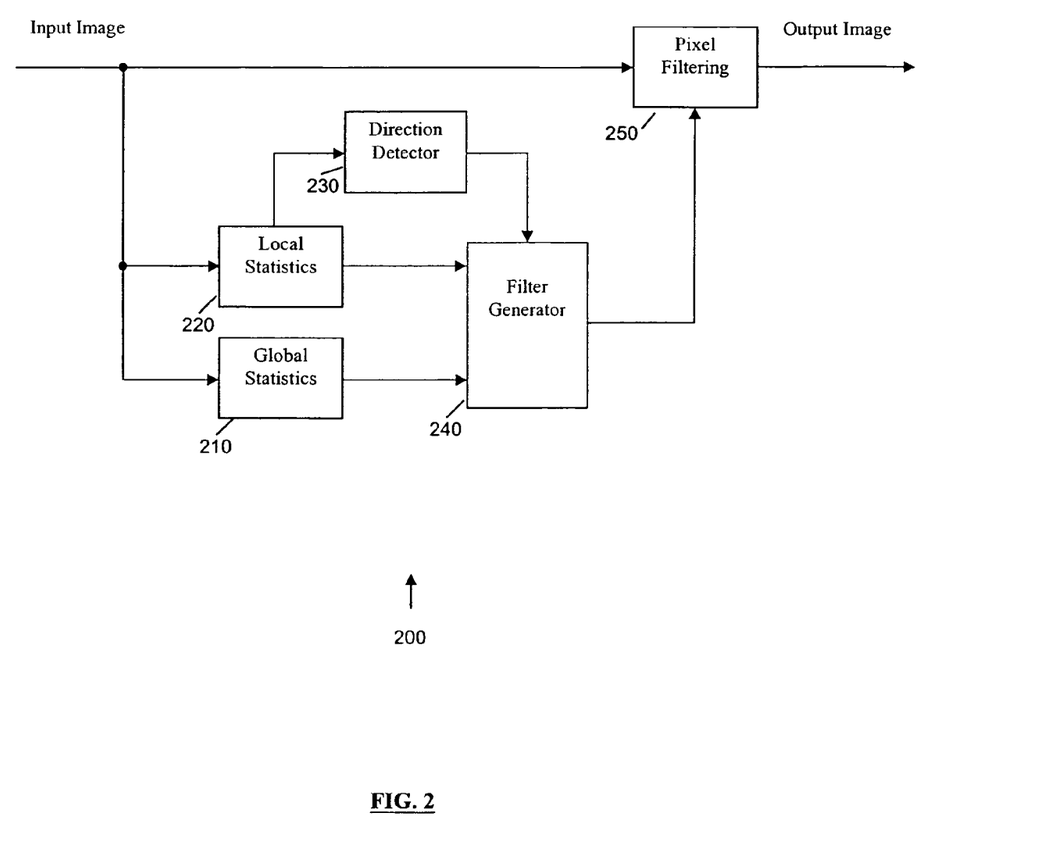
FIG. 2 shows a functional block diagram of an embodiment of a global and local statistics controlled noise reduction system according to the present invention.

An example of the noise reduction system according to the present invention is now described. FIG. 2 shows a functional block diagram of the example global and local statistics controlled noise reduction system 200 according to an embodiment of the present invention. The system 200 comprises a Global Statistics unit 210, a Local Statistics unit 220, a Direction Detector 230, a Filter Generator 240, and a Pixel Filtering unit 250. A digital video input image is first supplied to both the Global Statistics unit 210 and the Local Statistics unit 220. The Global Statistics unit 210 estimates the global noise statistics using said noise estimation method (also described further below). The output of the Global Statistics unit 210 is the global noise standard deviation $\sigma$, which is supplied to the Filter Generator 240. The Local Statistics unit 220 computes the 2-D local variance within a small window centered at the current pixel and the 1-D local variances along four directions within the same window.

Figure 3:
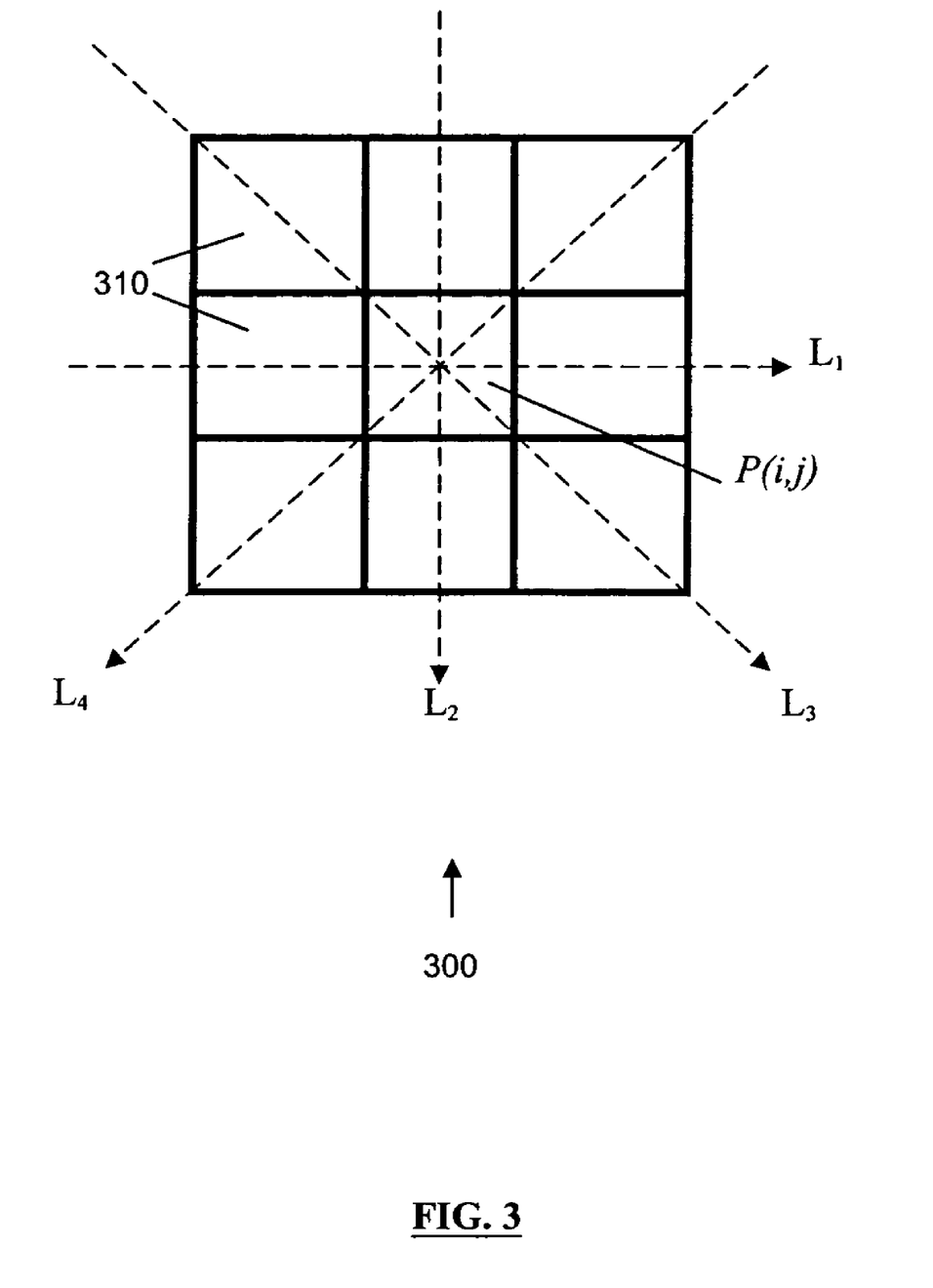
FIG. 3 illustrates example directions for computing the 1-D variances in the system of FIG. 2.

FIG. 3 illustrates an example two-dimensional window 300 including nine image pixels 310, and example directions for computing the 1-D local variances for pixel (i,j), where i and j are the indices for pixel row and column, respectively. The designations $L_1$, $L_2$, $L_3$ and $L_4$ denote the horizontal, vertical, diagonal from upper left to lower right, and diagonal from upper right to lower left directions, respectively. Further, the designation $\sigma_k^2$ denotes the 1-D local variance computed for direction $L_k$, wherein k=1, 2, 3 or 4. And, the designation $\sigma_0^2$ denotes the 2-D local variance.

In the example of FIG. 3, P(i,j) denotes e.g. the image gray-scale value of the pixel at position (i,j), wherein the local variances $\sigma_k^2$ (k=0, 1, 2, 3, 4) at pixel (i,j) are computed within the 3×3 window 300 by example as follows.

If k=0, then $\sigma_0^2$ is the 2-D variance, and is computed by:

$$\sigma_0^2 = \left(\sum_{s=-1}^{1}\sum_{t=-1}^{1}(P(i+s, j+t) - \mu_0)^2\right)\bigg/ 9,$$

where $\mu_0$ is the corresponding 2-D mean, defined as:

$$\mu_0 = \left(\sum_{s=-1}^{1}\sum_{t=-1}^{1} P(i+s, j+t)\right)\bigg/ 9.$$

If k>0, then $\sigma_k^2$ (k=1, 2, 3, 4) are 1-D variances along the direction $L_k$ (k=1, 2, 3, 4), and are computed by:

$\sigma_1^2 = ((P(i,j-1)-\mu_1)^2 + (P(i,j)-\mu_1)^2 + (P(i,j+1)-\mu_1)^2)/3;$ $\sigma_2^2 = ((P(i-1,j)-\mu_2)^2 + (P(i,j)-\mu_2)^2 + (P(i+1,j)-\mu_2)^2)/3;$ $\sigma_3^2 = ((P(i-1,j-1)-\mu_3)^2 + (P(i,j)-\mu_3)^2 + (P(i+1,j+1)-\mu_3)^2)/3;$ $\sigma_4^2 = ((P(i-1,j+1)-\mu_4)^2 + (P(i,j)-\mu_4)^2 + (P(i+1,j-1)-\mu_4)^2)/3;$ where $\mu_k$ (k=1, 2, 3, 4) are the means along the direction $L_k$ (k=1, 2, 3, 4), and are computed by:

$\mu_1 = (P(i,j-1) + P(i,j) + P(i,j+1))/3;$ $\mu_2 = (P(i-1,j) + P(i,j) + P(i+1,j))/3;$ $\mu_3 = (P(i-1,j-1) + P(i,j) + P(i+1,j+1))/3;$ $\mu_4 = (P(i-1,j+1) + P(i,j) + P(i+1,j-1))/3;$

After computing the local variances, the Local Statistics unit 220 (FIG. 2) provides the 1-D local variances to the Direction Detector 230 to determine the local edge direction. The Direction Detector 230 then selects the direction that has the smallest 1-D variance as the local edge direction, and provides it to the Filter Generator 240. The Local Statistics unit 220 also provides the computed 1-D and 2-D local variances to the Filter Generator 240, to generate/configure a local filter based on the statistics quantities provided by both the Local Statistics unit 220 and the Global Statistics unit 210.

The Filter Generator 240 generates a local filter for the pixel to be filtered. The direction of the local filter is the local edge direction detected by the Direction Detector 230. The strength of the local filter is computed by using the global noise standard deviation σ provided by the Global Statistics unit 210 and the local variances $\sigma_k^2$ (k=0, 1, 2, 3, 4) provided by the Local Statistics unit 220. For edge direction $L_k$ (k=1, 2, 3, 4), the designation $\alpha_k$ (k=1, 2, 3, 4) denotes the corresponding filter strength along those directions. Further, the designation $\alpha_0$ denotes the filter strength for non-edge area filtering. While $\alpha_k$ (k=1, 2, 3, 4) controls the strength for filtering along the edge direction, $\alpha_0$ controls the strength for non-edge area filtering.

The filter strengths $\alpha_k$ (k=1, 2, 3, 4) for edge direction $L_k$ (k=1, 2, 3, 4) are functions of the global noise standard deviation and the local variance, and are computed in one example as:

$$\alpha_k = \min(2\sigma, \max(3\sigma - \sigma_k, 0))/(2\sigma);$$

wherein min(a,b) is the minimal function that returns the smaller one of the two values a and b, and max(a,b) is the maximal function that returns the larger one of the two values a and b.

Figure 4:
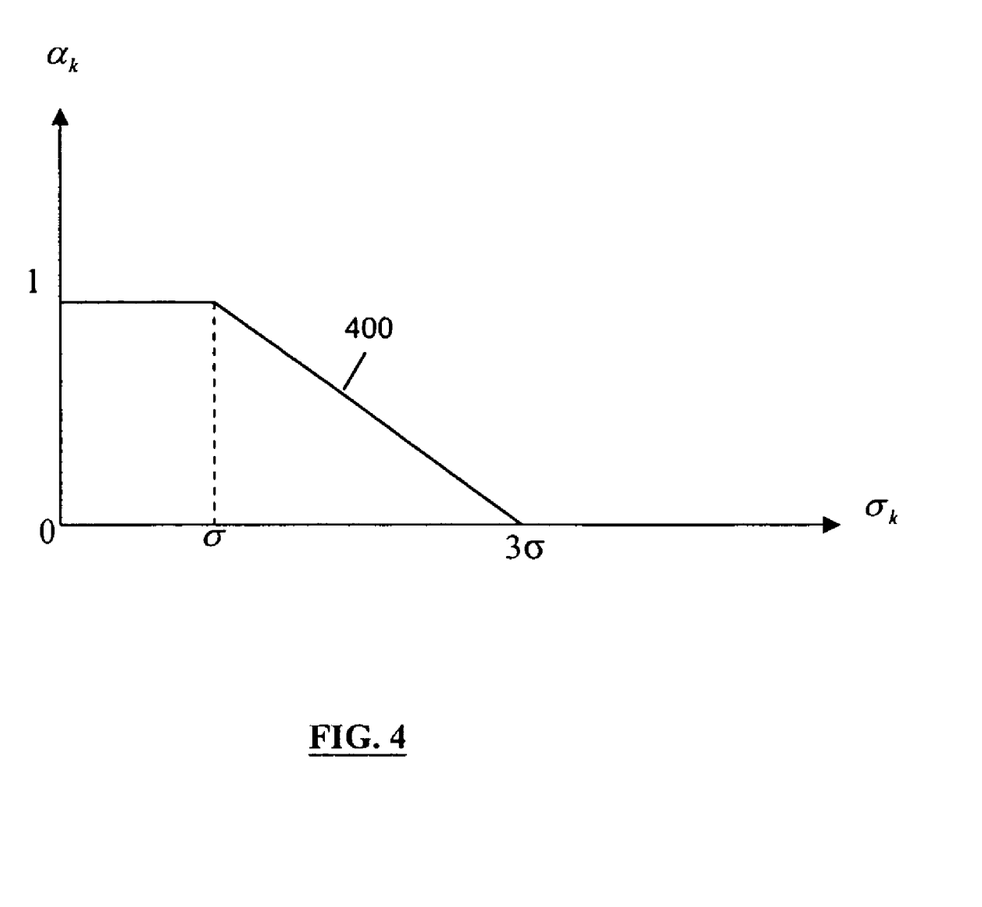
FIG. 4 shows an example curve representing dependency of the filter strength on local variance and global noise standard deviation.

FIG. 4 shows an example curve/plot 400 of the filter strength function $\alpha_k$. When $\sigma_k$ (i.e., the square root of the local variance) is small in comparison with the global noise standard deviation σ (indicating that the local change is caused by noise), the local filter has full strength. When $\sigma_k$ is large in comparison to a (indicating that the local change along the detected direction is caused by image structure), the local filter has zero strength. In between, the local filter strength continuously varies with $\sigma_k$. Further, the filter strength $\alpha_k$ varies with the global noise standard deviation σ (i.e., it increases as the global noise standard deviation increases).

The filter strength $\alpha_0$ for non-edge area is computed similarly as following:

$$\alpha_0 = \min(2\sigma, \max(3\sigma - \sigma_0, 0))/(2\sigma).$$

The curve for $\alpha_0$ is similar to that for $\alpha_k$ (k=1, 2, 3, or 4) shown in FIG. 4.

Using the detected local edge direction $L_k$ (k=1, 2, 3, or 4), the edge direction filter strengths $\alpha_k$ (k=1, 2, 3, or 4), and the non-edge area filter strength $\alpha_0$ computed above, the Filter Generator unit 240 (FIG. 2) generates/configures the local filter $f_k$ (k=1, 2, 3, or 4) as follows:

If the detected direction is $L_1$, then $f_1$ is a 2-D local filter for horizontal direction, and is defined as:

$$f_1 = \frac{1}{9}\begin{bmatrix} \alpha_0 & \alpha_0 & \alpha_0 \\ \alpha_0 + 3\alpha_1(1-\alpha_0) & \alpha_0 + 3(3-2\alpha_1)(1-\alpha_0) & \alpha_0 + 3\alpha_1(1-\alpha_0) \\ \alpha_0 & \alpha_0 & \alpha_0 \end{bmatrix};$$

If the detected direction is $L_2$, then $f_2$ is a 2-D local filter for vertical direction, and is defined as:

$$f_2 = \frac{1}{9}\begin{bmatrix} \alpha_0 & \alpha_0 + 3\alpha_2(1-\alpha_0) & \alpha_0 \\ \alpha_0 & \alpha_0 + 3(3-2\alpha_2)(1-\alpha_0) & \alpha_0 \\ \alpha_0 & \alpha_0 + 3\alpha_2(1-\alpha_0) & \alpha_0 \end{bmatrix};$$

If the detected direction is $L_3$, then $f_3$ is a 2-D local filter for the diagonal direction from upper left to lower right, and is defined as:

$$f_3 = \frac{1}{9}\begin{bmatrix} \alpha_0 + 3\alpha_3(1-\alpha_0) & \alpha_0 & \alpha_0 \\ \alpha_0 & \alpha_0 + 3(3-2\alpha_3)(1-\alpha_0) & \alpha_0 \\ \alpha_0 & \alpha_0 & \alpha_0 + 3\alpha_3(1-\alpha_0) \end{bmatrix};$$

and

If the detected direction is $L_4$, then $f_4$ is a 2-D local filter for the diagonal direction from upper right to lower left, and is defined as:

$$f_4 = \frac{1}{9}\begin{bmatrix} \alpha_0 & \alpha_0 & \alpha_0 + 3\alpha_4(1-\alpha_0) \\ \alpha_0 & \alpha_0 + 3(3-2\alpha_4)(1-\alpha_0) & \alpha_0 \\ \alpha_0 + 3\alpha_4(1-\alpha_0) & \alpha_0 & \alpha_0 \end{bmatrix}.$$

The generated local filter $f_k$ is supplied to the Pixel Filtering unit 250 (FIG. 2). The pixel is then filtered using the weighted sum of its neighboring pixels within a e.g. 3×3 window with the corresponding filter coefficients as the weights.

As noted, the Global Statistics unit 210 estimates the global noise statistics using a preferred noise estimation method. Different methods have been proposed to estimate the noise present in the images, such as those described in the paper by S. I. Olsen: "Noise Variance Estimation in Images: An Evaluation", Graphical Models and Image Processing, vol. 55, no. 4, pp. 319-323, 1993.

However, existing methods have not properly considered saturation effects (i.e., pixel values driven into saturation (0 or 255) by the noise, causing inaccurate estimates (in most cases underestimates) of noise). Inaccurate noise estimate can have serious impact on the performance of the noise reduction system that is controlled by global noise statistics.

Figure 5:
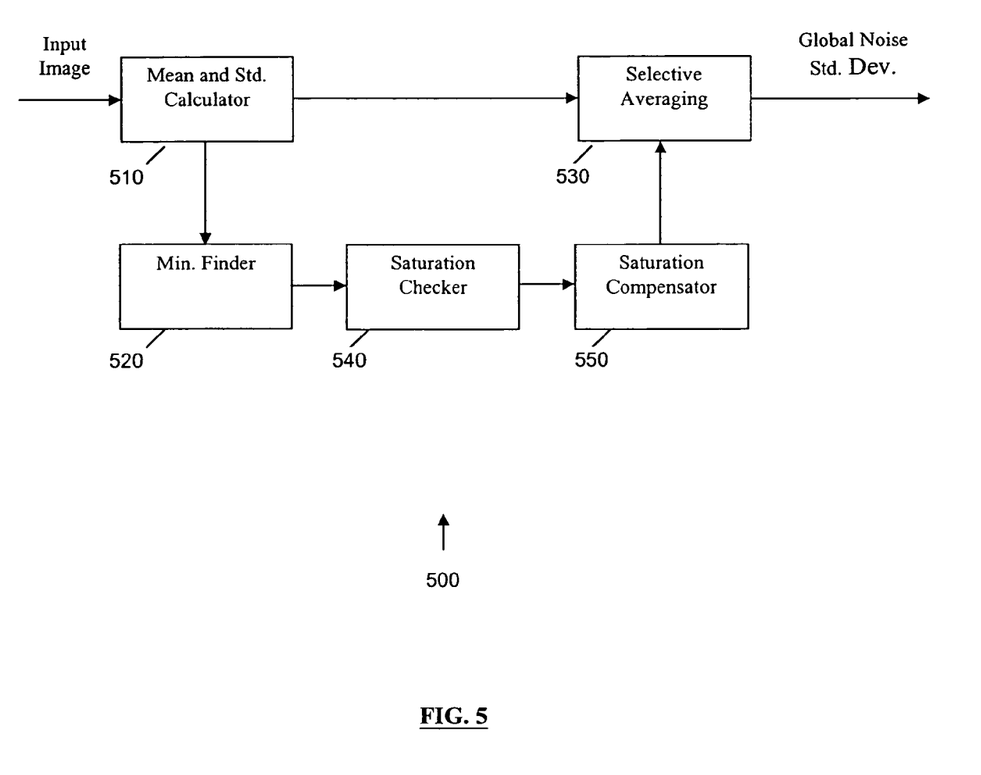
FIG. 5 shows a function block diagram of an embodiment of a noise estimation system utilized for the global statistics computing unit of FIG. 2.

FIG. 5 shows a functional block diagram of an example noise estimation system 500 according to the present invention, for the Global Statistics Computing unit 210 of FIG. 2. The example noise estimation system 500 according to the present invention is capable of handling said saturation effect and providing accurate noise estimates. The input image is first divided into overlapping or non-overlapping blocks $B_n$ of size H×W; (n=1,2, ..., N); where N is the total number of blocks, and the mean and the standard deviation of each block are computed by a Mean and Standard Deviation Calculator unit 510. The selected block size should not be too small to ensure a robust estimate. Preferably, the block size is e.g. 7×7 or 5×9 pixels (other block sizes can be used). The mean $m_n$ and the standard deviation $d_n$ of block $B_n$ are computed in the unit 510, respectively, as:

$$m_n = \frac{\sum_{(i,j) \in B_n} P(i,j)}{H \times W};$$

$$d_n = \sqrt{\frac{\sum_{(i,j) \in B_n} (P(i,j) - m_n)^2}{H \times W}}.$$

The computed block standard deviations and means are then provided to a Minimal Finder 520. The block standard deviations are also provided to a Selective Averaging unit 530.

The Minimal Finder 520 finds the smallest standard deviation, and records the smallest standard deviation and its corresponding block mean as $d_0$ and $m_0$, respectively, wherein the values $d_0$ and $m_0$ are then supplied to a Saturation Checker 540.

The Saturation Checker 540 checks whether saturation has occurred in the block with the smallest standard deviation $d_0$. That is, the Saturation Block checker determines/detects if pixel values in the block are driven into saturation (e.g., 0 or 255) due to noise, which may cause inaccurate estimates of image noise. If saturation has occurred, a Saturation Compensator 550 compensates for $d_0$.

Figure 6A:
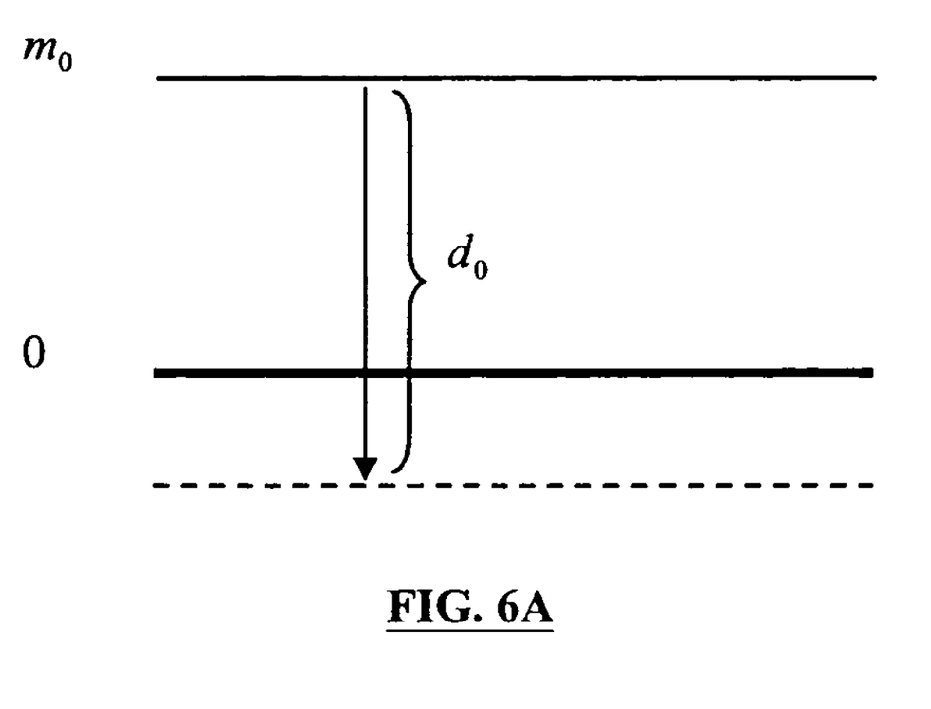
FIGS. 6A and 6B show example diagrams illustrating the effect of pixel values driven into saturation (0 or 255) by noise.

Examples of saturation detection criteria and the compensation methods are provided below in conjunction with FIGS. 6A-6B which illustrate examples of the effect of pixel values driven into saturation by noise (e.g., pixel value is at a lower limit such as 0 or at an upper limit such as 255).

Figure 6B:
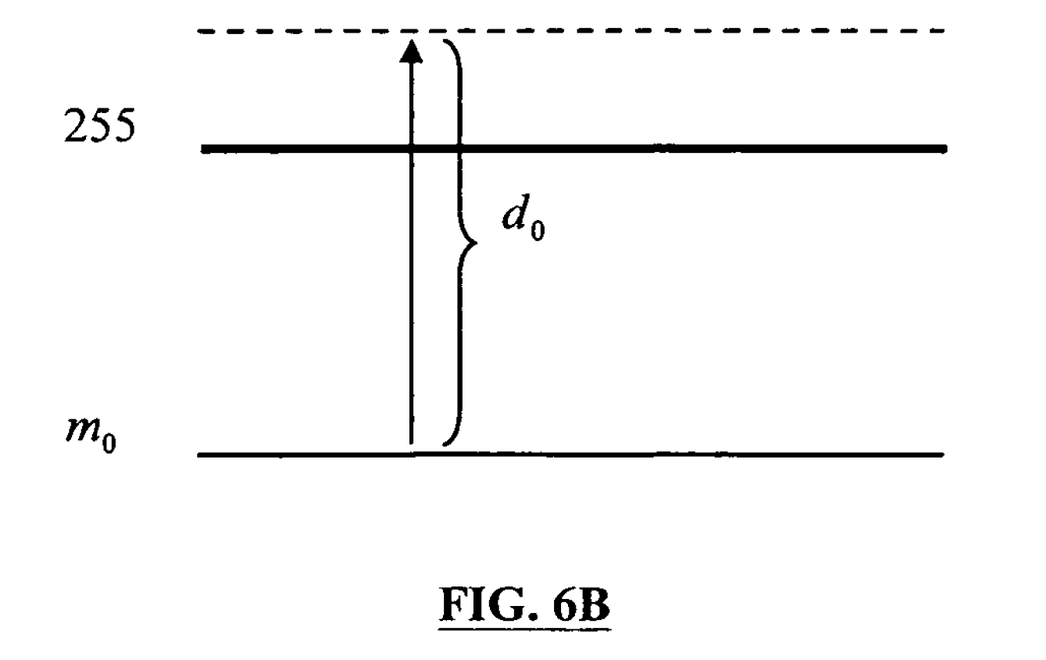

For this example an upper limit UL=255, a lower limit LL=0 and a mid value M=128. Such that, if $m_0 < 128$ and $d_0 > m_0 - 0$, then saturation is detected at the lower limit 0 (FIG. 6A). In this case $d_0$ is compensated as $\tilde{d}_0 = d_0 + K \cdot (d_0 - (m_0 - 0))$, wherein $\tilde{d}_0$ denotes the compensated smallest standard deviation;

If $m_0 \geq 128$ and $d_0 > 255 - m_0$, then saturation is detected at the upper limit 255 (FIG. 6B). In this case $d_0$ is compensated as $\tilde{d}_0 = d_0 + K \cdot (d_0 - (255 - m_0))$;

Otherwise, no saturation is detected. In this case no compensation is needed for $d_0$, therefore $\tilde{d}_0 = d_0$.

In the above expressions for $\tilde{d}_0$, the compensation parameter_K is empirically determined. Preferably in this example K=5.0 is used. As those skilled in the art will recognize, the saturation detection method can be easily generalized to other situations where the images are represented by different bit values and therefore have different values for UL, LL and M.

The compensated smallest standard deviation $\tilde{d}_0$ is then supplied to the Selective Averaging unit 530 (FIG. 5) to generate the final estimate of the global noise standard deviation $\sigma$, utilized in the system 200 of FIG. 2.

The Selective Averaging unit 530 (FIG. 5) first selects those block standard deviations (provided by the Mean and Standard Deviation Calculator 510) that are within a selected range of (e.g., close to) the compensated smallest standard deviation $\tilde{d}_0$. In one example, a block standard deviation $d_n$ (n=1,2, . . . ,N) is considered within a range of $\tilde{d}_0$ if $|d_n - \tilde{d}_0| < \max(\tilde{d}_0, 1)$. The selected block standard deviations are then averaged, and the average value is taken as the final estimate of the global noise standard deviation $\sigma$, for use in the system 200 (FIG. 2).

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated. The aforementioned systems 200 and 500 according to the present invention can be implemented in many ways, such as program instructions for execution by a processor, as logic circuits, as ASIC, as firmware, etc., as is known to those skilled in the art. Therefore, the present invention is not limited to the example embodiments described herein.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method for reducing noise in a digital image formed from a plurality of pixels including a given pixel, the method comprising the steps of:

computing global statistics from the image;

computing local statistics for the given pixel;

configuring a local filter using the local and global statistics;

filtering the given pixel using the local filter to reduce image noise;

wherein the step of computing the local statistics for the given pixel further includes the steps of:

selecting a window containing the given pixel and a plurality of neighboring pixels;

computing a 2-D local variance of the given pixel based on information related to the pixels in the window;

computing a plurality of 1-D local variances along multiple directions through the given pixel in the window; and detecting a local edge direction by selecting one of the directions with the smallest 1-D local variance, wherein the step of configuring the local filter using the local and global statistics includes the steps of:

selecting the detected local edge direction L as the direction of the local filter;

for the detected local edge direction L, computing a 1-D filter strength as a function of a square root of a local variance and a global noise standard deviation;

computing a 2-D filter strength as a function of the local variance and the global noise standard deviation; and configuring the local filter for the detected local edge direction L based on the 1-D and 2-D filter strengths.

2. The method of claim 1, wherein the step of configuring the local filter using the local and global statistics further includes the steps of:

selecting the detected local edge direction $L_k$ (k=1, 2, 3, or 4) as the direction of the local filter;

for the detected local edge direction $L_k$, computing the 1-D filter strength $\alpha_k = \min(2\sigma, \max(3\sigma - \sigma_k, 0))/(2\sigma)$ wherein $\sigma$ is the global noise standard deviation, and $\sigma_k$ is the square root of the local variance (k=1, 2, 3, or 4);

computing the 2-D filter strength $\alpha_0 = \min(2\sigma, \max(3\sigma - \sigma_0, 0))/(2\sigma)$ wherein $\sigma_0$ is a square root of a 2-D local variance; and configuring the local filter $f_k$ for the detected local edge direction $L_k$ according to the following conditions, wherein $\alpha_k$ is the filter strength along the local edge direction $L_k$ [k=0 (non-edge), 1 (horizontal), 2 (vertical), 3 (upper left to lower right, 4 (upper right to lower left)]:

(i) if the detected direction is $L_1$, then $f_1$ is configured as a 2-D local filter for horizontal direction, wherein:

$$f_1 = \frac{1}{9} \begin{bmatrix} \alpha_0 & \alpha_0 & \alpha_0 \\ \alpha_0 + 3\alpha_1(1-\alpha_0) & \alpha_0 + 3(3-2\alpha_1)(1-\alpha_0) & \alpha_0 + 3\alpha_1(1-\alpha_0) \\ \alpha_0 & \alpha_0 & \alpha_0 \end{bmatrix};$$

(ii) if the detected direction is $L_2$, then $f_2$ is configured as a 2-D local filter for vertical direction, wherein:

$$f_2 = \frac{1}{9}\begin{bmatrix} \alpha_0 & \alpha_0 + 3\alpha_2(1-\alpha_0) & \alpha_0 \\ \alpha_0 & \alpha_0 + 3(3-2\alpha_2)(1-\alpha_0) & \alpha_0 \\ \alpha_0 & \alpha_0 + 3\alpha_2(1-\alpha_0) & \alpha_0 \end{bmatrix};$$

(iii) if the detected direction is $L_3$, then $f_3$ is configured as a 2-D local filter for the diagonal direction from upper left to lower right, wherein:

$$f_3 = \frac{1}{9}\begin{bmatrix} \alpha_0 + 3\alpha_3(1-\alpha_0) & \alpha_0 & \alpha_0 \\ \alpha_0 & \alpha_0 + 3(3-2\alpha_3)(1-\alpha_0) & \alpha_0 \\ \alpha_0 & \alpha_0 & \alpha_0 + 3\alpha_3(1-\alpha_0) \end{bmatrix};$$

and (iv) if the detected direction is $L_4$, then $f_4$ is configured as a 2-D local filter for the diagonal direction from upper right to lower left, wherein:

$$f_4 = \frac{1}{9}\begin{bmatrix} \alpha_0 & \alpha_0 & \alpha_0 + 3\alpha_4(1-\alpha_0) \\ \alpha_0 & \alpha_0 + 3(3-2\alpha_4)(1-\alpha_0) & \alpha_0 \\ \alpha_0 + 3\alpha_4(1-\alpha_0) & \alpha_0 & \alpha_0 \end{bmatrix}.$$

3. A method for reducing noise in a digital image formed from a plurality of pixels including a given pixel, the method comprising the steps of:
 computing global statistics from the image;
 computing local statistics for the given pixel;
 configuring a local filter using the local and global statistics;
 filtering the given pixel using the local filter to reduce image noise;
 wherein the step of computing the local statistics for the given pixel further includes the steps of:
 selecting a window containing the given pixel and a plurality of neighboring pixels;
 computing a 2-D local variance of the given pixel based on information related to the pixels in the window;
 computing a plurality of 1-D local variances along multiple directions through the given pixel in the window; and
 detecting a local edge direction by selecting one of the directions with the smallest 1-D local variance,
 wherein the step of computing the global statistics comprises the step of estimating a global noise standard deviation σ to generate the global statistics,
 wherein the step of estimating the global noise standard deviation σ further includes the steps of:
 dividing the input image into overlapping or non-overlapping blocks;
 computing a mean and a standard deviation for each block;
 finding the smallest standard deviation $d_0$ and its corresponding mean $m_0$;
 detecting block saturation due to noise;
 compensating for the smallest standard deviation $d_0$ to generate a compensated smallest standard deviation $\tilde{d}_0$;
 selecting the block standard deviations $d_n$ that are within a range of the compensated smallest standard deviation $\tilde{d}_0$; and
 averaging the selected block standard deviations $d_n$ to generate an estimate of the global noise standard deviation σ.

4. The method of claim 3, wherein the block size is 7×7 or 5×9 pixels.

5. The method of claim 3, wherein the steps of detecting block saturation due to noise and compensating for the smallest standard deviation include the steps of:
 defining an upper pixel value limit UL, a lower pixel value limit LL, and a mid value M between UL and LL,
 wherein if the mean $m_0$ is less than the mid value M, and the smallest standard deviation is greater than a difference between the mean $m_0$ and the lower limit LL, then saturation has occurred at the lower limit LL, and the smallest standard deviation $d_0$ is compensated by adding thereto a compensation term that is a function of the smallest standard deviation $d_0$ and said difference between the mean $m_0$ and the lower limit LL, to generate the compensated smallest standard deviation $\tilde{d}_0$;
 else if the mid value M is less than the mean $m_0$, and the smallest standard deviation $d_0$ is greater than the difference between the upper limit UL and the mean $m_0$, then saturation has occurred at the upper limit UL, and the smallest standard deviation $d_0$ is compensated by adding thereto a compensation term that is a function of the smallest standard deviation $d_0$ and the difference between the upper limit UL and the mean $m_0$, to generate the compensated smallest standard deviation $\tilde{d}_0$;
 otherwise, no saturation has occurred, wherein $\tilde{d}_0 = d_0$.

6. The method of claim 3, wherein the steps of detecting block saturation due to noise and compensating for the smallest standard deviation include the steps of determining the following:
 where UL is an upper pixel value limit, LL is a lower pixel value limit, M is a mid pixel value, and UL<M<LL, if the mean $m_0$<M and the smallest standard deviation $d_0$>$m_0$−LL, then saturation has occurred at the lower limit LL, wherein $d_0$ is compensated as $\tilde{d}_0 = d_0 + K \cdot (d_0 - (m_0 - LL))$, such that K is a compensation factor;
 else if the mean $m_0 \geq M$ and the smallest standard deviation $d_0$>UL−$m_0$, then saturation has occurred at the upper limit UL, wherein $d_0$ is compensated as $\tilde{d}_0 = d_0 + K \cdot (d_0 - (UL - m_0))$;
 otherwise, no saturation has occurred, wherein $\tilde{d}_0 = d_0$.

7. The method of claim 6, wherein LL=0, UL=255, and M=128.

8. The method of claim 3, wherein the step of selecting the block standard deviations includes the steps of selecting the block standard deviation $d_n$ for averaging if $|d_n - \tilde{d}_0| < \max(\tilde{d}_0, 1)$.

9. A noise reduction system for reducing noise in a digital image comprising pixels, the system comprising:
 a global statistics module that computes global statistics from the image;
 a local statistics module that computes local statistics for each of a plurality of image pixels including a given pixel;
 a filter configuration module that uses the local and global statistics for the given pixel to configure a local filter for filtering the given pixel;
 the local filter as configured by the filter configuration module, being adapted for filtering the given pixel to reduce image noise, wherein the local statistics module computes the local statistics for the given pixel by:

selecting a window containing the given pixel and a plurality of neighboring pixels;

computing a 2-D local variance of said pixel based on information related to the pixels in the window;

computing a plurality of 1-D local variances along multiple directions each defined by a pair of the pixels in the window; and detecting a local edge direction for the given pixel by selecting one of the directions with the smallest 1-D local variance, wherein the global statistics module estimates a global noise standard deviation σ to generate the global statistics, wherein the filter configuration module configures the local filter for each pixel using the local and global statistics by:

selecting a detected local edge direction L as the direction of the local filter;

for the detected local edge direction L computing a 1-D filter strength as a function of the square root of the local variance and the global noise standard deviation;

computing a 2-D filter strength as a function of a local variance and a global noise standard deviation; and configuring the local filter for the detected local edge direction L based on the 1-D and 2-D filter strengths.

10. The system of claim 9, wherein the filter configuration module configures the local filter for each pixel using the local and global statistics by:

selecting the detected local edge direction $L_k$ (k=1, 2, 3, or 4) as the direction of the local filter;

for the detected local edge direction $L_k$, computing the 1-D filter strength $\alpha_k = \min(2\sigma, \max(3\sigma - \sigma_k, 0))/(2\sigma)$ wherein σ is the global noise standard deviation, and $\sigma_k$ is the square root of the local variance (k=1, 2, 3, or 4), and the 2-D filter strength $\alpha_0 = \min(2\sigma, \max(3\sigma - \sigma_0, 0))/(2\sigma)$ wherein $\sigma_0$ is a square root of a 2-D local variance; and configuring the local filter $f_k$ for the detected local edge direction $L_k$ according to the following conditions:

(i) if the detected direction is $L_1$, then $f_1$ is configured as a 2-D local filter for horizontal direction, wherein:

$$f_1 = \frac{1}{9}\begin{bmatrix} \alpha_0 & \alpha_0 & \alpha_0 \\ \alpha_0 + 3\alpha_1(1-\alpha_0) & \alpha_0 + 3(3-2\alpha_1)(1-\alpha_0) & \alpha_0 + 3\alpha_1(1-\alpha_0) \\ \alpha_0 & \alpha_0 & \alpha_0 \end{bmatrix};$$

(ii) if the detected direction is $L_2$, then $f_2$ is configured as a 2-D local filter for vertical direction, wherein:

$$f_2 = \frac{1}{9}\begin{bmatrix} \alpha_0 & \alpha_0 + 3\alpha_2(1-\alpha_0) & \alpha_0 \\ \alpha_0 & \alpha_0 + 3(3-2\alpha_2)(1-\alpha_0) & \alpha_0 \\ \alpha_0 & \alpha_0 + 3\alpha_2(1-\alpha_0) & \alpha_0 \end{bmatrix};$$

(iii) if the detected direction is $L_3$, then $f_3$ is configured as a 2-D local filter for the diagonal direction from upper left to lower right, wherein:

$$f_3 = \frac{1}{9}\begin{bmatrix} \alpha_0 + 3\alpha_3(1-\alpha_0) & \alpha_0 & \alpha_0 \\ \alpha_0 & \alpha_0 + 3(3-2\alpha_3)(1-\alpha_0) & \alpha_0 \\ \alpha_0 & \alpha_0 & \alpha_0 + 3\alpha_3(1-\alpha_0) \end{bmatrix};$$

and (iv) if the detected direction is $L_4$, then $f_4$ is configured as a 2-D local filter for the diagonal direction from upper right to lower left, wherein:

$$f_4 = \frac{1}{9}\begin{bmatrix} \alpha_0 & \alpha_0 & \alpha_0 + 3\alpha_4(1-\alpha_0) \\ \alpha_0 & \alpha_0 + 3(3-2\alpha_4)(1-\alpha_0) & \alpha_0 \\ \alpha_0 + 3\alpha_4(1-\alpha_0) & \alpha_0 & \alpha_0 \end{bmatrix}.$$

11. A noise reduction system for reducing noise in a digital image comprising pixels, the system comprising:

a global statistics module that computes global statistics from the image;

a local statistics module that computes local statistics for each of a plurality of image pixels including a given pixel;

a filter configuration module that uses the local and global statistics for the given pixel to configure a local filter for filtering the given pixel;

the local filter as configured by the filter configuration module, being adapted for filtering the given pixel to reduce image noise, wherein the local statistics module computes the local statistics for the given pixel by:

selecting a window containing the given pixel and a plurality of neighboring pixels;

computing a 2-D local variance of said pixel based on information related to the pixels in the window;

computing a plurality of 1-D local variances along multiple directions each defined by a pair of the pixels in the window; and detecting a local edge direction for the given pixel by selecting one of the directions with the smallest 1-D local variance, wherein the global statistics module estimates a global noise standard deviation σ to generate the global statistics, wherein the input image comprises a plurality of blocks, and wherein the global statistics module further comprises:

a mean and standard deviation module that computes the mean and the standard deviation for each block;

a minimum finder module that finds the smallest standard deviation $d_0$ and its corresponding mean $m_0$;

a saturation detector that detects block saturation due to noise;

a saturation compensator that compensates for the smallest standard deviation $d_0$ to generate a compensated smallest standard deviation $\tilde{d}_0$; and a selective averaging module that selects the block standard deviations $d_n$ that are within a range of the compensated smallest standard deviation $\tilde{d}_0$, and averages the selected block standard deviations $d_n$ to generate an estimate of the global noise standard deviation σ.

12. The system of claim 11, wherein the block size is 7×7 or 5×9 pixels.

13. The system of claim 11, wherein:

an upper pixel value limit is denoted UL, a lower pixel value limit is denoted LL, and a mid value M is between UL and LL, wherein the saturation detector determines if the mean $m_0$ is less than the mid value M, and the smallest standard deviation is greater than a difference between the mean $m_0$ and the lower limit LL, indicating that saturation has occurred at the lower limit LL, and if so, the saturation compensator compensates for the smallest standard deviation $d_0$ by adding thereto a compensation term that is a function of the smallest standard deviation $d_0$ and said difference between the mean $m_0$ and the lower limit LL, to generate the compensated smallest standard deviation $\tilde{d}_0$;

else if the saturation detector determines that the mid value M is less than the mean $m_0$, and the smallest standard deviation $d_0$ is greater than a difference between the upper limit UL and the mean $m_0$, indicating saturation has occurred at the upper limit UL, the saturation compensator compensates for the smallest standard deviation $d_0$ by adding thereto a compensation term that is a function of the smallest standard deviation $d_0$ and said difference between the upper limit UL and the mean $m_0$, to generate the compensated smallest standard deviation $\tilde{d}_0$;

otherwise, no saturation has occurred, wherein $\tilde{d}_0 = d_0$.

14. The system of claim 13, wherein:

if the mean $m_0 < M$ and the smallest standard deviation $d_0 > m_0 - LL$, indicating saturation has occurred at the lower limit LL, then $d_0$ is compensated for as $\tilde{d}_0 = d_0 + K \cdot (d_0 - (m_0 - LL))$, such that K is a compensation factor;

else if the mean $m_0 \geq M$ and the smallest standard deviation $d_0 > UL - m_0$, indicating saturation has occurred at the upper limit UL, then $d_0$ is compensated for as $\tilde{d}_0 = d_0 + K \cdot (d_0 - (UL - m_0))$;

otherwise, no saturation has occurred, wherein $\tilde{d}_0 = d_0$.

15. The system of claim 14, wherein LL=0, UL=255, and M=128.

16. The system of claim 11, wherein the block standard deviations $d_n$ are selected for averaging if $|d_n - \tilde{d}_0| < \max(\tilde{d}_0, 1)$.

* * * * *